United States Patent [19]

Walker

[11] Patent Number: 4,690,556
[45] Date of Patent: Sep. 1, 1987

[54] CAPILLARY BORE STRAIGHTNESS INSPECTION

[75] Inventor: Ray A. Walker, Eugene, Oreg.

[73] Assignee: Spectra-Physics, Inc., San Jose, Calif.

[21] Appl. No.: 760,381

[22] Filed: Jul. 30, 1985

[51] Int. Cl.$^4$ ............................................. G01B 11/26
[52] U.S. Cl. .................................... 356/152; 356/138; 356/153
[58] Field of Search .................. 356/152, 153, 138; 372/107; 219/121 LX

[56] References Cited

U.S. PATENT DOCUMENTS

| | | | |
|---|---|---|---|
| 2,847,900 | 8/1958 | Dudzik et al. | 356/153 |
| 3,920,335 | 11/1975 | Seehase | 356/153 X |
| 3,999,858 | 12/1976 | Hernqvist et al. | 356/152 |
| 4,289,374 | 9/1981 | Franken et al. | 356/138 X |

Primary Examiner—Stephen C. Buczinski
Assistant Examiner—Linda J. Wallace
Attorney, Agent, or Firm—Donald C. Feix; Paul Davis; Thomas M. Freiburger

[57] ABSTRACT

A method for checking straightness of an elongated generally cylindrical bore, such as a capillary bore, includes directing a collimated light beam through the bore, with the bore skewed slightly with respect to the beam. This causes a wall of the bore to reflect some of the beam light, forming generally an off-axis ring of reflected light beyond the end of the bore, in addition to an on-axis spot of un-reflected light. Variation in the off-axis reflected light ring pattern by scatter of reflected light indicates non-straightness of the reflecting bore wall. Variation of the light in the ring is determined by measuring equipment. The cylindrical bore may be rotated sequentially through a plurality of positions, such as four positions, to check the entire circumference of the bore. The degree of bore non-straightness may be quantitatively measured electronically or mechanically. The methods of the invention may be used to check straightness of bores that are tapered or not tapered and to check diameter and out-of-roundness of bores.

27 Claims, 8 Drawing Figures

CAPILLARY BORE STRAIGHTNESS INSPECTION

BACKGROUND OF THE INVENTION

The invention relates to checking and measuring trueness of a cylindrical bore, and more particularly to a method and apparatus for determining and measuring non-straightness of an elongated cylindrical bore utilizing a collimated light beam.

A capillary tube is an important element in a laser, and the capillary inspection step in the manufacturing process is vital to maximizing the optical output properties of a laser. Inspection methods prior to the present invention have utilized both mechanical and optical techniques in an effort to determine straightness of the capillary bore.

In mechanical testing, typically a rod of diameter slightly less than the nominal bore diameter was passed through the bore to check straightness. If the rod passed freely through the bore, this would verify bore straightness. If the rod failed to pass through, rods of slightly smaller diameter were attempted until one was found that would pass through bore, indicating the degree of non-straightness of the bore. This mechanical method required very clean conditions and provided only qualified Prior optical testing methods for checking bore straightness have included (a) placing the capillary bore in the path of an external-mirror laser; and (b) visual observation of the inside of the capillary bore, with the naked eye or with the help of a lens. Placing the capillary in the active path of an external-mirror laser would in principle allow the optical properties of the beam path introduced by the test capillary to be measured. However, in practical effect, this prior method has been found to be of questionable resolve and has been difficult to implement.

Visual observation has been a common method for observation of capillary bore straightness. The visual method has utilized the multiple reflections of an illuminated end of a bore as the bore was observed from the opposite end. The reflections would produce rings down the bore length and the concentricity of the rings would give a relative measure of the bore straightness.

In other elongated bores, from very small to large diameters, including bores of rifles, for example, verification of straightness is required. Verification of other properties, such as diameter and trueness of bore position within a cylindrical body (eccentricity) is also required in many circumstances.

There has been a need, in the laser industry and in other fields, for a more precise and better quantified manner of inspection of bores. It is desirable to have a single method with the ability to inspect both straight cylindrical and tapered bore shapes, as well as to inspect capillaries of various lengths.

SUMMARY OF THE INVENTION

The present invention is a method and associated apparatus which achieve all of the above goals and additionally can provide a measure for bore diameter and bore out-of-roundness.

In general, the method of the invention, for inspecting straightness of an elongated bore having a substantially smooth surface, includes directing a beam of light through the bore, such that a portion of the light beam engages the bore wall at a small angle and is reflected by the bore wall, forming generally an off-axis ring of reflected light as well as an on-axis spot of non-reflected light (referring to the beam axis), beyond the end of the bore. Non-straightness of the reflecting bore wall is determined by detecting scatter of light away from the ring of reflected light. Thus, a bore of unknown straightness is compared to one of known straightness, or to a reflection pattern known to be typical of a straight bore.

The detection of the scattering of the light preferably is accomplished by detection of light falling in areas inward of the ring of reflected light and exterior of the ring. This may be accomplished by excluding the on-axis spot of non-reflected light and the ring of reflected light, as by masking, and focusing the remaining scattered light onto a photodetector and thereby monitoring its intensity. Alternately, monitoring of the amount of light in the ring of reflected light may be used, to detect attenuation of the ring and thus indirectly measure scatter from the ring.

The bore may be a tapered bore, tapering to smaller diameter away from the light source, with the test beam being substantially coaxial with the bore center line.

In another embodiment, the bore may be substantially cylindrical, the beam of light being a coaxial but diverging beam.

In a further preferred embodiment, the bore may be substantially cylindrical, with the beam of light slightly skewed with respect to the bore so that the light engages and reflects off one side of the bore wall.

The light source may be a laser or another form of collimated light beam, the diameter of the beam preferably being close to the diameter of the bore.

Other and further objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be a made as desired by those skilled in the art without departing from the present invention and the purview of the appended claims.

DESCRIPTION OF PREFERRED EMBODIMENTS

Figure 1:
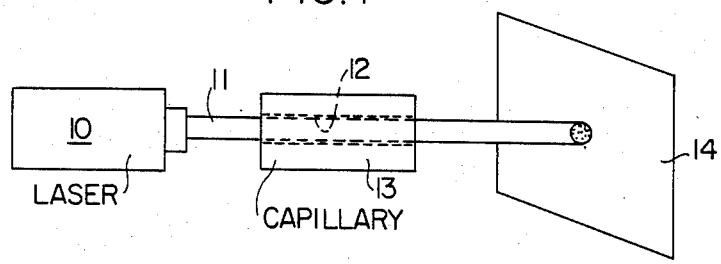
FIG. 1 shows in elevation view a laser light source projecting a beam through a capillary bore, which is shown truncated in this schematic view. The beam is shown projected onto an observation screen.

In the drawings, FIG. 1 shows a source 10 of substantially collimated light, such as a laser, projecting a beam 11 through a bore 12, such as that of a capillary tube 13. The beam 11 passes through the bore and is intercepted by an observation screen 14. The capillary tube and bore are shown foreshortened in these figures.

Figure 2:
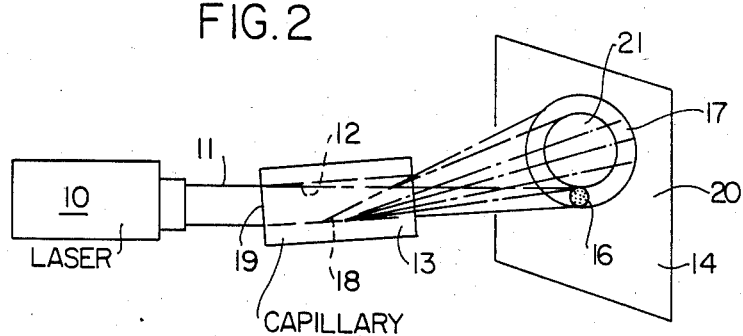
FIG. 2 shows the same arrangement as in FIG. 1, but with the bore slightly skewed with respect to the laser beam, for conducting a bore straightness test according to the invention. The skewed bore reflects a portion of the laser beam light and creates a ring of relected light on the observation screen.

FIG. 2 illustrates that when the bore 12 is skewed slightly, at a very small angle with respect to the axis of the light beam 11, one side of the bore will interrupt a portion of the beam 11, causing an off-axis reflection of that portion of the beam. The resulting beam pattern observed on the observation screen 14 will now show most of the straight-through beam spot 16 as in FIG. 1, and will additionally show an off-axis ring of reflected light 17 caused by the reflection from the side of the bore 18 against which the light beam engages. The beam 11 remains centered on the near opening 19 of the bore 12 during this test.

The skew angle of the bore with respect to the light beam is small enough that light reflecting off one side of the bore will not be reflected onto the other side before exiting the other end of the bore.

If the bore side 18 reflecting the light and creating the ring 17 is precisely straight the ring 17 will be well defined. However, if the bore wall is non-straight to any appreciable degree, the ring will be poorly defined, and some of the light normally directed into the ring geometry will be instead scattered away from the ring area, toward areas 20 exterior of the ring 17 and toward an area 21 inward of the ring 17.

Figure 3:
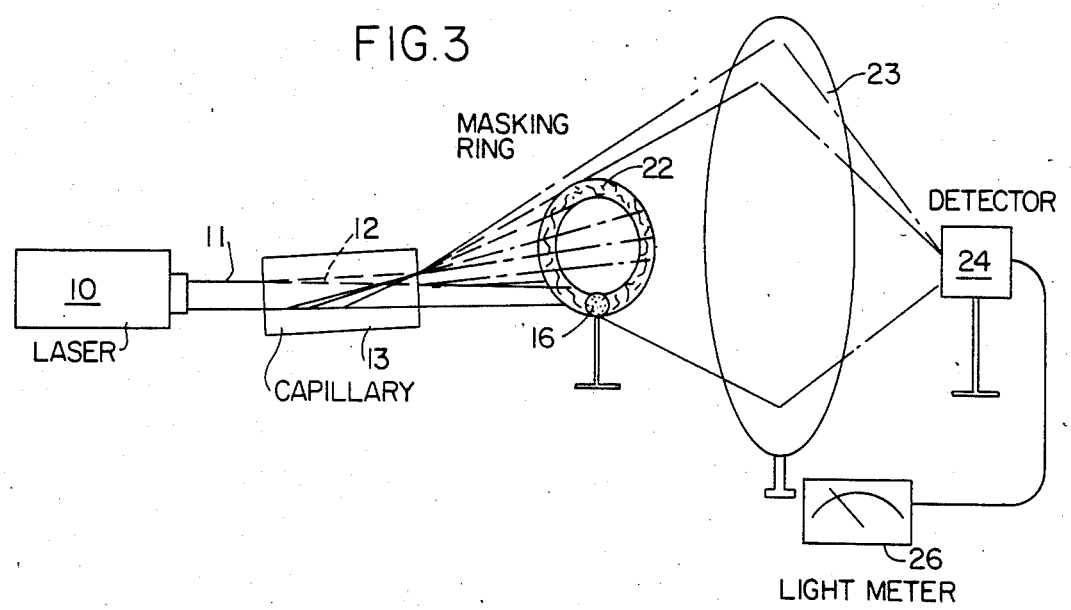
FIG. 3 shows an arrangement similar to FIG. 2, but including a masking ring, a light-collecting lens and a photo-detector, for determining and measuring scattered light caused by non-straightness of the bore wall in the capillary tube.

It has been found with the present invention that the bore staightness can be quantified by a light masking and detection arrangement such as that shown in FIG. 3. The observation screen of FIG. 2 is replaced by a masking ring 22 which matches the ring 17's shape and position expected for precisely straight bores. Light falling on the masking ring is blocked from passing through a light collecting lens 23 and to a photodetector 24 onto which the convex collecting lens 23 focuses any light passing through it.

When a non-straight bore 12 is being inspected, the light from the beam 11 is not all reflected to the ring 17 and onto the masking ring 22, but instead some is misdirected by the crooked bore surface and scattered past the masking ring to the light collecting lens 23, from which it is focused onto the photodetector 24 where its intensity may be measured with the assistance of a light meter 26. Scattered light may fall outside the mask 22 or inward of the mask.

The light intensity read at the light meter 26, that is, the amount of light passing the masking ring and subsequently focused onto the detector 24, is a measure of the non-straightness of the bore being inspected.

In capillary bores, non-straightness generally is in the form of a fundamental bow, i.e. a generally symmetrical curving of the tube from end to end. If the light beam strikes the bore wall on the side where it is inwardly bowed, so that the beam sees a rise, this generally will scatter some of the light outside the ring 17, at the opposite side of the ring from the direct spot 16 (which would be above the masking ring 22 as viewed in FIG. 3). If the beam strikes the bore wall where it is outwardly bowed and sees a depression, the scattered light generally will all fall interior of the ring 17 and the mask 22.

As mentioned above, instead of measuring the light scattered from the ring 17, the intensity of the ring 17 itself may be directly measured, in selected areas, and its variation from a maximum (for a straight bore) intensity value will be a measure of the degree of non-straightness.

It should be understood that these described and illustrated light scatter detection methods, while among the preferred methods, are not the only methods that can be used. For example, another method is to use a video camera, and to process the video signal with simple thresholding of a single scan line or complex processing of the complete image.

Figure 4:
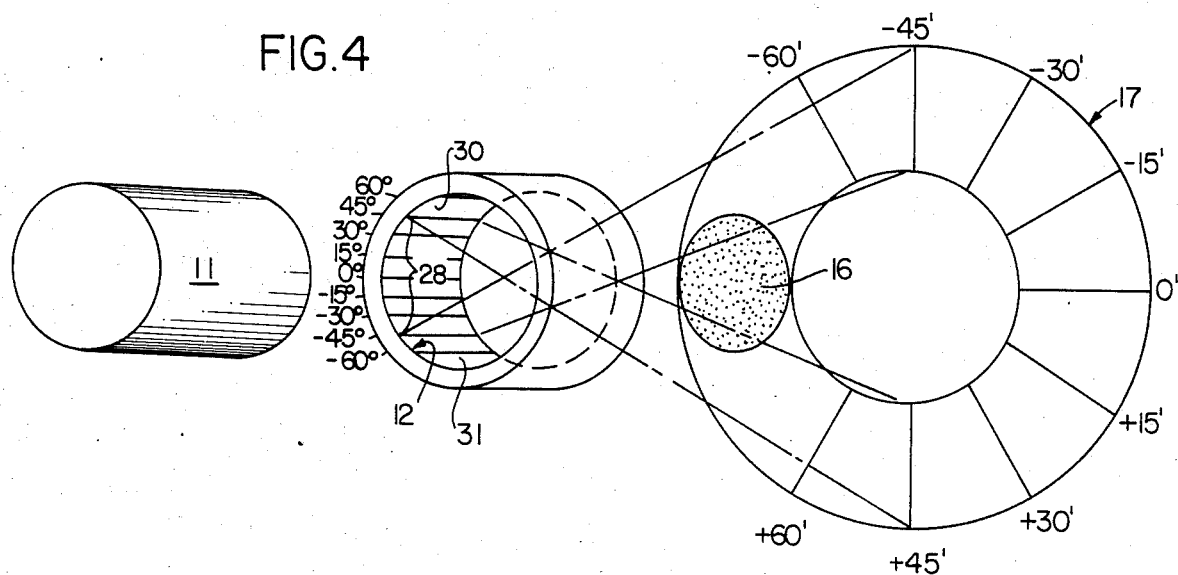
FIG. 4 is a somewhat graphic representation showing portions of the laser beam which reflect to create the ring of reflected light shown in FIG. 2 and 3.

The inspection method described is limited to inspecting one side of the bore at a time, but covers the entire length of the bore down that side, since the bore is positioned such that the light beam impinges down the entire length of the side. In actual practice, only about 90° of bore cross section can be inspected at one time, and the full 360° are inspected by rotating the bore about its center line continuously or sequentially, to a series of different rotational positions, e.g. four positions. FIG. 4 illustrates the geometry involved.

In FIG. 4 the beam 11 passes through a bore 12 skewed laterally, in a horizontal plane.

As indicated, light rays of the light beam 11 falling on an arc 28 on the left of the bore wall, between a $+45°$ position and a $-45°$ position, produce one half of the ring 17 of reflected light, that is the approximate half-circular arc of light to the right of the positions marked $-45'$ and $+45''$ on the ring 17 in FIG. 4. Thus, 90° of the bore wall produce 180° of the ring 17.

The remainder of the ring 17, to the left of the $+45'$ and $-45'$ positions, is formed by the remaining upper and lower arcs 30 and 31 of the bore's left half as viewed in FIG. 4. The ring 17 fades more and more as it approaches the spot 16, fading almost completely as it reaches the spot, since little light reflects from the top or bottom of the laterally-skewed bore 12 in FIG. 4.

It should be noted that for a complete ring 17 to be formed, the test beam 11 must be substantially the full diameter of the bore. Also for contacting the full length of the bore wall using reasonable bore skew angles the beam must be about bore diameter size. A narrow pencil of light much smaller than the bore diameter will form only a partial ring 17, will only reflect off a limited length of the bore wall, and will yield less information regarding the bore. A very narrow beam will be entirely reflected from a small length of bore wall and will produce only an offset spot of reflected light.

Generally, when testing small elongated capillary bores, it is necessary for a screen 14 or mask 22 to be several capillary tube lengths away from the exit end of the bore, in order for a ring 17 of sufficient size to be generated for use according to the invention. The reflection angle off the bore wall is very small, so the rays separate slowly, over a long distance to produce a ring of appreciable size. However, this length requirement can be cumbersome and may be avoided by appropriate means for folding or foreshortening the beam path. The beam path and reflected light can be folded using mirrors, to absorb the distance, or foreshortened using a lens to increase the divergence of the rays.

Figure 5:
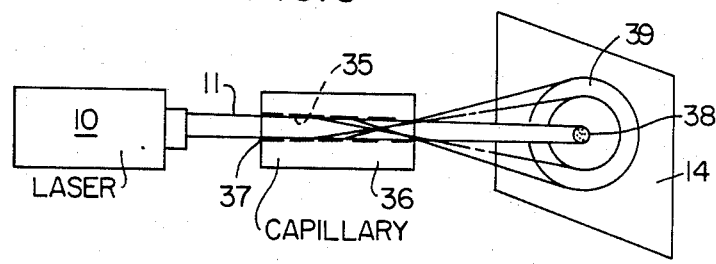
FIG. 5 illustrates an arrangement similar to FIGS. 1 and 2, but for testing a tapered bore using a coaxial beam of light.

FIG. 5 shows a test arrangement according to the invention for checking the straightness of a tapered bore 35 in a capillary tube 36 (shown greatly foreshortened) or other bore body or structure using a cylindrical collimated beam 11 from a source 10. This apparatus and method are similar to that described above, except that the beam 11 is coaxial with the tapered bore 35, with no skewing. The beam 11 is preferably of such diameter as to substantially fill the bore 35 at its larger, inlet end 37.

The result of this arrangement is that a direct beam spot 38 is formed on the observation screen 14, and a ring of reflected light 39 is formed around and concentrically with the central spot 38. This assumes a bore 35 with a straight center line.

However, if the bore wall 35 includes a bend, usually in the form of a fundamental bow as discussed above, some of the reflected light will be scattered, both outside the ring 39 and interior of the ring. Such scattered light may be detected and measured in the same manner as described above with reference to FIG. 3, except that the bore does not need to be rotated to scan its entire surface.

Figure 6:
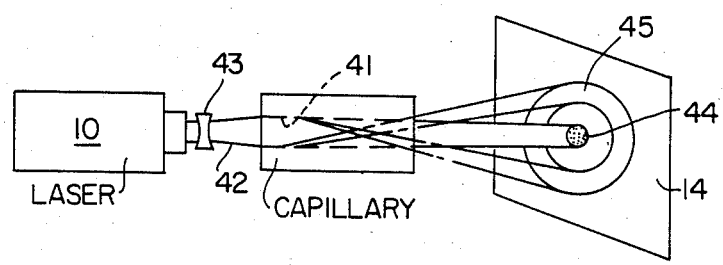
FIG. 6 is another arrangement somewhat similar to FIGS. 1 and 2, but in this case showing a non-tapered cylindrical bore being tested by a coaxial, diverging beam of light.
Figure 7:
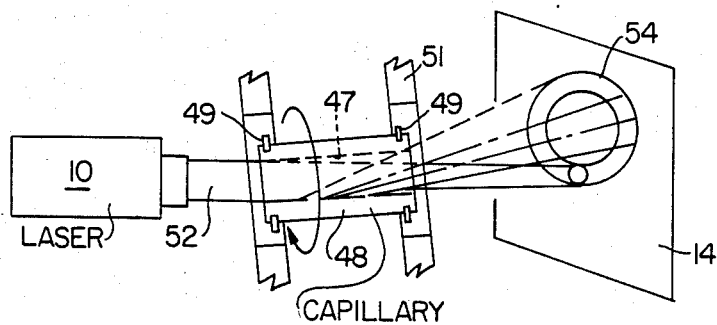
FIG. 7 shows schematically a related system which may be used for measuring bore diameter and bore out-of-roundness.

FIG. 6 shows a similar arrangement, but for checking the straightness of a non-tapered cylindrical bore 41. In this arrangement the light beam 42 is made slightly divergent, as by a concave lens 43, and the diverging beam 42 substantially fills the bore 41 as it enters the first end as seen in FIG. 6. Again, this will produce a central direct beam spot 44 on the observation screen 17, and a surrounding concentric ring of reflected light 45. Redirection of the light from the ring 45, i.e. the presence of scattered light around the ring and within the interior of the ring, indicates non-straightness and may be quantified as discussed above. Again, the bore need not be rotated to scan its entire surface FIG. 7 shows a test arrangement for checking either out-of-roundness or for measuring the diameter of a bore 47. The capillary tube or other structure 48 which includes the bore 47 is placed in chucks 49 on a rotating mandrel 51, such that the axis of rotation is coaxial with the axis of the bore 47. The bore and mandrel assembly is then skewed with respect to the beam axis and the capillary 48 is then rotated by the mandrel about the bore 47 axis.

If the bore 47 is out-of-round, e.g. egg-shaped, the size of the ring 54 of reflected light on a screen 14 will vary, cycling larger or smaller as the bore 47 rotates.

This test setup will also allow detection of eccentricity of bores which are perfectly straight and cylindrical, but eccentric within the bore body. However, this requires that the bore body, rather than the bore itself, be mounted concentrically with the rotation axis.

With the same test arrangement shown in FIG. 7, the diameters of bores may be measured. A bore 47 which is not out-of-round is connected in the chucks 49 so that the mandrel axis is precisely coaxial with the axis of the bore 47. The bore and mandrel assembly is then skewed with respect to the beam axis. The mandrel is rotated, and the size of the ring 54 of reflected light will be correlated to the size of the bore 47. For a given light beam 52, which substantially fills the bore 47, the size of the reflected ring 54 can be calibrated to indicate the diameter of the bore.

In determining the straightness of bores, there will normally be a threshold of non-straightness dividing acceptable bores from non-acceptable bores for a particular application, such as capillary bores for lasers. It is therefore desirable to measure the amount of out-of-straightness of capillary bores, particularly those near the threshold of acceptability.

Figure 8:
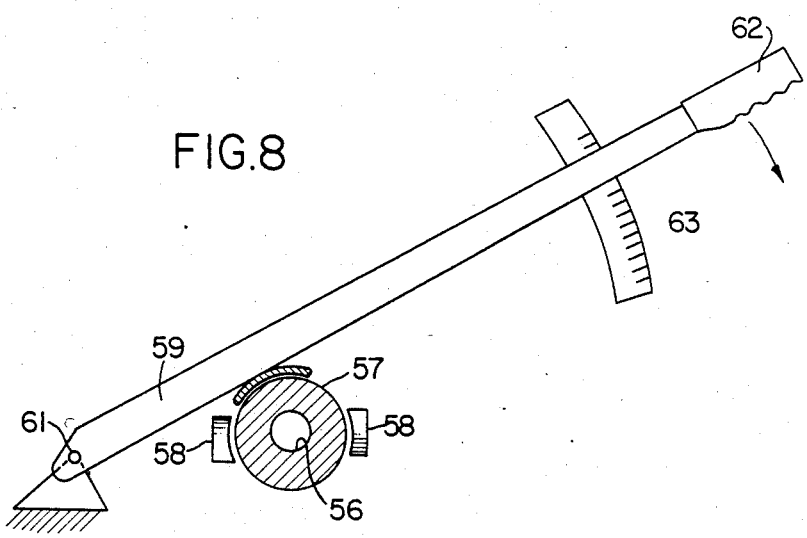
FIG. 8 illustrates an apparatus and a method for measuring the degree of non-straightness in a bore by measuring deflection as the bore is bent to straight configuration.

FIG. 8 schematically indicates a simple arrangement for measuring the degree of non-straightness in the bore 56 of a capillary tube 57 (or other bore structure). This simple arrangement can be superior to the use of electronics, such as with photodetectors for quantifying non-straightness, since the electronic method requires normalization of the light beam, which tends to vary from time to time.

In accordance with the method and measurement system of FIG. 8, the capillary tube 57 or other bore body is set up generally as shown in FIG. 2, FIG. 5 or FIG. 6 above. It is retained in position by an appropriate rigid retaining device indicated by clamping members 58 in FIG. 8. For this measurement method, the retaining or clamping members 58 hold the capillary tube 57 only at or near its ends. A lever 59 connected at a fixed pivot point 61 is then used to manually bend the tube 57 in the direction of straightening of the non-straight bore 56. This requires first determining the orientation of the non-straightness using the system and methods described above, and orienting the tube accordingly.

The lever 59 simply illustrates one means by which a straightening force may be mechanically applied to the tube 57, and the deflection measured to indicate the degree of non-straightness of the bore. Any application of force causing a measured deflection, applied so as to straighten out the bore, will be sufficient. A more precise deflection measuring apparatus may be used, e.g. involving a micrometer or dial indicator and a screw threaded type force applicator.

In any event, the force is applied to the tube, as by pulling down on a handle 62 of the lever 59, while the ring of reflected light 17 (see FIGS. 2, 3, etc.) is observed. When true straightness is achieved by deflection of the tube 57, the ring 17 of reflected light will become clear, better-defined, and brighter. If the force applied becomes too great, deflecting the tube 57 beyond straightness, the ring will again dim and become less well-defined. Thus, the operator can easily find the point at which the tube 57 is straight. At this point, he observes measuring indicia 63 adjacent to the lever 59 (or indicia on a separate measuring instrument engaging the tube).

While I have illustrated and described the preferred embodiments of our invention, it is to be understood that these are capable of variation and modification, and I therefore do not wish to be limited to the precise details set forth, but desire to avail myself of such changes and alterations as fall within the purview of the following claims.

I claim:

1. A method for checking straightness of an elongated generally cylindrical bore having a substantially smooth surface, comprising,
directing a substantially collimated light beam having a longitudinal axis through the bore,
skewing the bore slightly by a preselected angle with respect to the beam, so that a wall of the bore reflects some of the beam light, forming generally an off-axis ring of reflected light as well as an on-axis spot of non-reflected light beyond the end of the bore, and determining scatter of reflected light in directions other than toward of reflected light, indicating non-straightness of the reflecting bore wall.

2. The method of claim 1, including rotating the bore about its axis to a plurality of different angular positions and checking bore straightness in each position by making the determination of reflected light scattering in each position.

3. The method of claim 1, including detecting scattered reflected light in areas adjacent to the ring of reflected light.

4. The method of claim 3, including measuring the quantity of scattered reflected light, indicating degree of non-straightness of the bore wall.

5. The method of claim 4, wherein the measurement is accomplished by focussing the scattered reflected light in said areas onto a photodetector and measuring its intensity.

6. The method of claim 5, further including masking the ring of reflected light using a mask in the shape of the ring so that only the scattered light reaches the photodetector.

7. The method of claim 1, including masking the ring of reflected light using a mask generally in the shape of the ring to allow only the scattered reflected light to pass, and focussing the scattered reflected light onto a photodetector and measuring its intensity, providing a measure of the nonstraightness of the bore wall.

8. The method of claim 7, further including rotating the bore about its axis to a plurality of different angular positions and checking bore straightness in each position by making the determination of reflected light scattering in each position, so that the entire bore wall is checked.

9. The method of claim 1, wherein the beam has a beam diameter substantially the size of the bore.

10. The method of claim 1, further including measuring the degree of non-straightness of the bore by applying a force to straighten a non-straight bore, and, while observing the ring of reflected light, deflecting the bore to a straight configuration wherein the ring of reflected light reaches maximum sharpness and intensity, and measuring the amount of deflection at that point.

11. A method for inspecting the straightness of an elongated tapered bore, comprising, directing a beam of collimated light through the bore, such that the bore is tapering smaller away from the light source, the beam being substantially coaxial with the bore, and such that a portion of the light beam engages the bore wall at a small angle and is reflected by the bore wall, forming generally a ring of reflected light as well as a spot of non-reflected light, beyond the end of the bore, and determining non-straightness of the reflecting bore wall by detecting scatter of reflected light in directions other than toward the ring of reflected light.

12. The method of claim 11, wherein the scatter detecting is accomplished by detection of light falling in areas not including the ring of reflected light.

13. The method of claim 12, including focussing the scattered light, and excluding the spot of non-reflected light and the ring of reflected light, onto a photodetector and thereby monitoring its intensity.

14. The method of claim 12, including masking the ring of reflected light and the spot of non-reflected light and directing the remaining light through a lens and focussing it onto a photodetector to monitor its intensity.

15. The method of claim 11, further including measuring the degree of non-straightness of the bore by applying a force to straighten a non-straight bore, and, while observing the ring of reflected light, deflecting the bore to a straight configuration wherein the ring of reflected light reaches maximum sharpness and intensity, and measuring the amount of deflection at that point.

16. The method of claim 11, wherein the beam of light comprises a laser beam.

17. The method of claim 11, wherein the angle between the bore and the light beam is sufficiently small that no portion of the beam is reflected twice off the bore.

18. Apparatus for checking straightness of an elongated bore in a bore body, the bore having a substantially smooth surface, comprising:

a light source projecting a beam of light, retaining means for holding the bore body in the path of the beam such that the beam of light is slightly skewed with respect to the bore so that the light engages and reflects off one side of the bore wall, at a skewing angle sufficiently small that no portion of the beam reflects more than once off the bore, forming generally a ring of reflected light as well as a spot of direct non-reflected light, beyond the end of the bore, and detection means for determining non-straightness in the bore wall by detecting scatter of reflected light in directions other than toward the ring of reflected light.

19. The apparatus of claim 18, wherein the detection means comprises means for focussing and measuring the intensity of the scattered light, and excluding the ring of reflected light.

20. The apparatus of claim 19, wherein the detection means includes a mask positioned to mask the ring of reflected light.

21. The apparatus of claim 18, further including means for measuring the degree of non-straightness of the bore including means for bending a non-straight bore to straight configuration while observing the ring of reflected light and means for measuring the deflection of the bore when straightness is achieved, confirmed by observation of sharp definition of the ring of reflected light.

22. The apparatus of claim 29, wherein the retaining means includes means for holding the bore body near its ends and for applying a force between the ends in a direction tending to straighten the bore.

23. The apparatus of claim 21, wherein the beam of light comprises a laser beam.

24. The apparatus of claim 18, wherein the beam is a collimated beam substantially the size of the bore.

25. A method for checking for out-of-roundness in a cylindrical bore of a bore body, comprising, directing a beam of collimated light through the bore with the bore body retained on a rotatable mandrel, such that the axis of the bore is precisely on the axis of rotation of the mandrel, and with the bore slightly skewed with respect to the light beam, rotating the bore body with the mandrel, observing on a screen beyond the end of the bore a ring of reflected light formed by the reflection of the beam off the bore wall, and observing whether the ring varies in size as the bore body is rotated, which will indicate out-of-roundness.

26. A method for checking and measuring diameter of a cylindrical bore of a bore body, comprising, directing a beam of collimated light through the bore with the bore body retained on a rotatable mandrel, such that the axis of the bore is precisely on the axis of rotation of the mandrel, and with the bore slightly skewed with respect to the light beam, rotating the bore body with the mandrel, observing on a screen beyond the end of the bore a ring of reflected light formed by the reflection of the beam off the bore wall, and comparing the size of the ring to known calibrated sizes formed with a similar light beam and representative of bore diameter.

27. Apparatus for checking straightness of an elongated tapered bore in a bore body, the bore having a substantially smooth surface, comprising:

a light source projecting a beam of collimated light, retaining means for holding the bore body in the path of the beam with the bore tapering smaller away from the light source such that a portion of the light beam engages the bore wall at a small angle and is reflected by the bore wall, forming generally a ring of reflected light as well as a spot of direct non-reflected light, beyond the end of the bore, and detection means for determining non-straightness in the bore wall by detecting scatter of reflected light not forming part of the ring of reflected light.

* * * * *

UNITED STATES PATENT AND TRADEMARK OFFICE
CERTIFICATE OF CORRECTION

PATENT NO. : 4,690,556
DATED      : September 1, 1987
INVENTOR(S) : Ray A. Walker It is certified that error appears in the above—identified patent and that said Letters Patent is hereby corrected as shown below:

Col. 7, line 6, after "toward" insert -- the ring --

Col. 8, line 53, "29" should be -- 21 --

Col. 8, line 57, "21" should be -- 18 --

Col. 1, line 23, after "through" insert -- the --

Col. 1, line 26, after "fied" insert -- results. --

Signed and Sealed this

Fifth Day of April, 1988

Attest:

DONALD J. QUIGG

Attesting Officer

Commissioner of Patents and Trademarks